Figure 1:
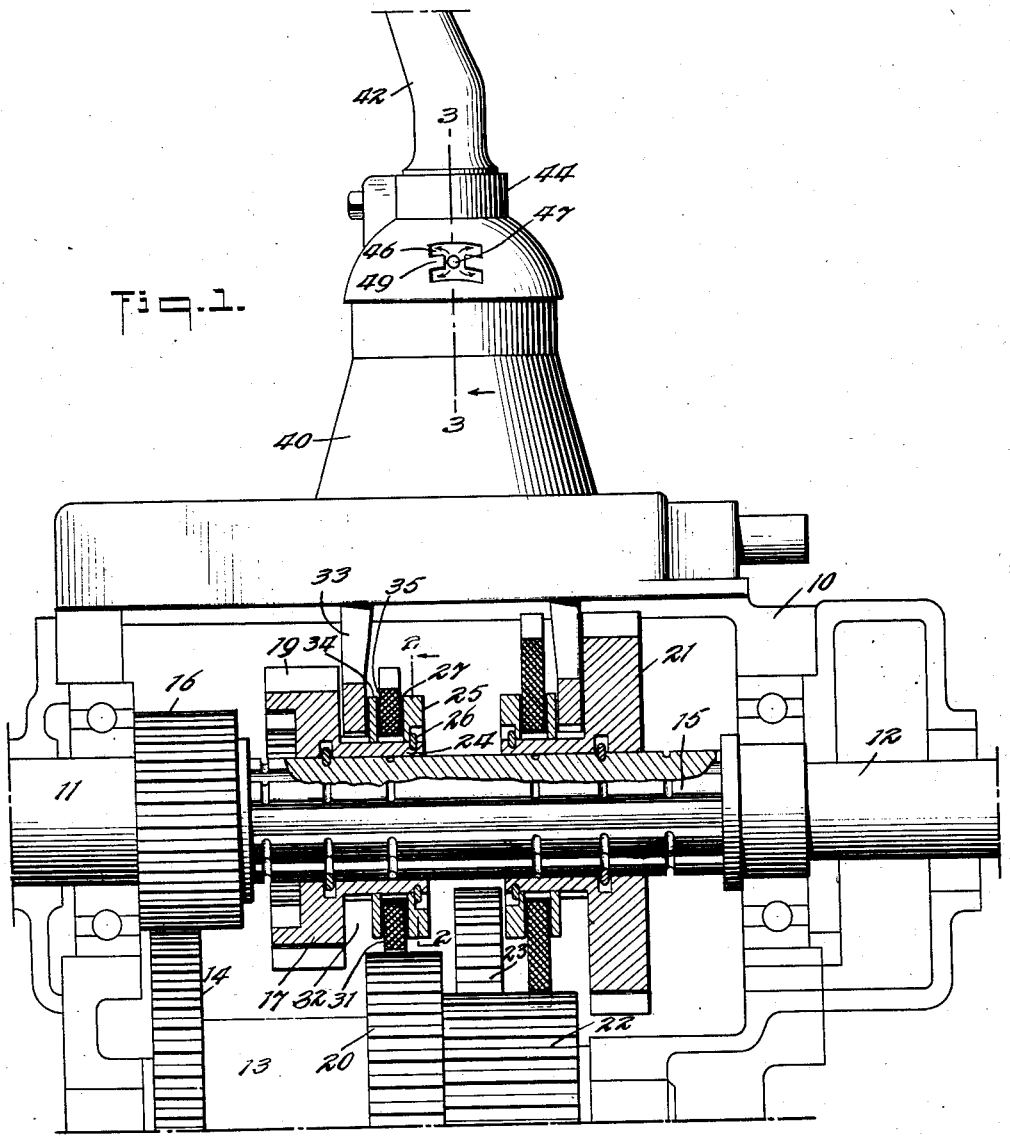

June 17, 1930.  H. J. MURRAY  1,764,333
DOUBLE CLUTCH SYNCHRONIZER
Filed Nov. 18, 1922

INVENTOR
Howard J. Murray
BY
Warren S. Orton.
ATTORNEYS

Patented June 17, 1930

1,764,333

UNITED STATES PATENT OFFICE

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE

DOUBLE-CLUTCH SYNCHRONIZER

Application filed November 18, 1922. Serial No. 601,689.

The invention relates in general to a variable speed power transmission mechanism of the gear shift type and in which the power driven and the load carrying gears are co-ordinated through the interposition of a clutch so that the gears will assume a speed of rotation equal to each other before the power gears are moved into meshed position. The invention specifically relates to that type of gear synchronizing mechanism in which the actuation of a single, manually-operated control member moving in one direction causes the gears to be connected initially through the medium of a clutch and the continued movement of which control member will cause an intermeshing of the power gears in their direct driving relation.

The present application constitutes one of a series of pending applications and constitutes another embodiment of the invention disclosed in the previously filed applications, to-wit: Serial No. 548,235, Power transmission mechanism, filed March 30, 1922; Serial No. 548,237, Sliding clutch gear synchronizer, filed March 30, 1922; Serial No. 548,236, which matured into Patent Number 1,511,232, Clutch ring synchronizing device, filed March 30, 1922 and Serial No. 582,168, which matured into Patent Number 1,502,345, Gear synchronizer, filed August 16, 1922.

In application Serial No. 548,235 the specific form of clutch selected for illustration was of the friction type including an internal band with concentrically disposed clutching members and in which the clutching movement takes place radially of the axis of rotation of the intermeshing gears. In application, Serial No. 548,237 there was illustrated a different form of friction clutch in which the movable element is shiftable to and from its clutching engagement with one of the power gears in a direction axially of the shaft which carries the same. In application, Serial No. 582,168 there was illustrated a spring resisted, mechanical clutching connection between the synchronizing gear and the power gear upon which it was slidably and rotatably mounted.

The present disclosure features the same advantages such as simplicity in structural design; ease of control in operating the same; positiveness of actuation and ready substitution of the corresponding gear unit in transmission casing of conventional structure, as is featured in the above identified companion applications.

Another object of the invention is to provide a simple means, differing from the means shown in the preceding applications for insuring the proper meshing of the synchronizer gear with the co-related power gear without danger of stripping the teeth of either gears.

Referring particularly to the showing in application, Serial No. 548,237, it is noted that the available power for shifting the gear sets, which power is usually manual force applied to the shifting fork, acts through the shiftable synchronizing gear and this gear is clutched to the stop formed on the carrying gear. This clutching action is affected frictionally through a single set of friction clutching inter-engaging surfaces. It is obvious that in those cases where the friction surface has become worn through long use, or where the load on the power gear causes a high torque action on either one of the clutch elements, a powerful muscular action is necessary to make the friction clutch effective and operative. Any breaking action which necessitates a powerful force in order to make it effective is not only dangerous, particularly when forming part of an automobile construction, but renders the brake ineffective where the operator does not possess the necessary strength.

Accordingly, the present disclosure has for an object the providing of a simple form of friction clutch form of gear synchronizer and particularly the providing of an improved form of clutch for such construction by means of which the synchronizing is made much more effective with less manual effort than is necessary with the single face type forms of synchronizer clutches disclosed in the above identified application, Serial No. 548,237.

Differently stated an object of the invention is to provide a friction clutch, as part of the synchronizing device, in which the applied braking force either manual, or mechanical, is more effective per unit of force applied to the shifting fork than has been possible with prior devices.

Still another object of this phase of the invention is to provide in connection with the shift lever a supplemental means for locking the shiftable gears in their several operative positions and which supplemental locking means are adapted for use in situations in which the gears are shifted either by the manually actuated control lever or in which the gears are shifted mechanically by suitable connection with the proper shift rod.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 2:
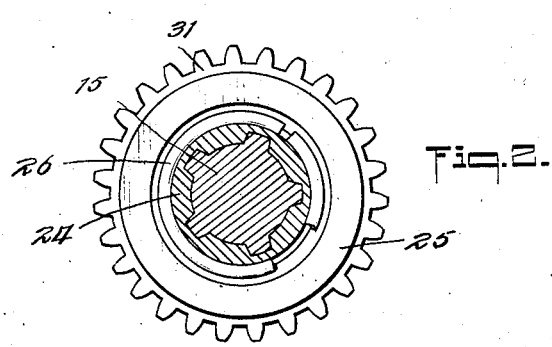

Figure 1 is a vertical sectional view taken axially of the power shafts through a transmission casing of conventional form, equipped with a preferred embodiment of the inventive features disclosed in this and in the above identified applications; and Figure 2 is a transverse sectional view through the synchronizing device taken on the line 2—2 of Figure 1 looking in the direction indicated by the arrow.

In the drawings there is shown a containing casing 10 for housing the several parts and for providing bearings for the several shafts and shift rods entering therein. Further for the purpose of showing the applicability of this invention to an automobile engine construction it will be considered that the shaft 11 is a power shaft operatively connected with the engine shaft of an automobile and that the shaft 12 is a propeller shaft operatively connected to drive the traction wheels of an automobile.

The propeller shaft projects into the casing in alignment with the power shaft and has certain portions thereof non-circular in cross-section to accommodate the combined sliding gear and clutch units hereinafter described. A counter-shaft 13 provided with a main drive gear 14 adjacent one end is rotatably mounted within the casing and parallels the encased non-circular portion 15 of the propeller shaft. The gear 14 is constantly in mesh with a main driving gear 16 fixed to the power shaft 11 so that the countershaft is constantly connected to be driven from or to drive the power shaft. A sliding gear unit 17 is keyed to the shaft 15 so as to rotate therewith, and is designed to mesh with the gear 16 to provide a direct drive between the shafts 11 and 12.

The gear unit 17 is provided with external teeth 19 hereinafter referred to as a driven gear and adapted, when meshed with a gear 20 keyed to the counter-shaft and hereinafter referred to specifically as a driving gear, to obtain second speed. Another gear 21 keyed to and slidably mounted on the shaft portion 15 is designed in one shifted position to mesh with a gear 22 on the countershaft to obtain first speed and in another shifted position to mesh with an intermediate gear 23 to obtain reversed speed.

In the following description particular reference will be made to the synchronizing of gears 19 and 20 but it will be understood that the invention with obvious mechanical changes can be adapted for use in other locations and as an illustration of one such use reference is made to the first speed and reverse speed synchronizing arrangement shown at the right side of Figure 1. The shiftable gear unit herein illustrated is provided with a reduced sleeve extension 24 which constitutes a hub providing a circular bearing for the synchronizer. An end plate 25 is keyed to the hub adjacent its outer end and is secured against endwise movement off the hub by means of a split ring 26 fitting in a groove adjacent the free end of the hub 24. The end plate is provided on the side facing the hub with a radially extending bearing face 27 designed to constitute one element of a friction clutch of the side face type.

The hub 24 provides a bearing for the synchronizer herein featured and this synchronizer includes a synchronizer gear 31 mounted when free of the clutch for rotary movement on the hub and free to slide for a limited movement on the hub to and from its clutching engagement with the friction face 27. The hub portion 24 also carries a follower plate 34 which is keyed to the hub so as to turn therewith and is free to have slight axial movement to and from the adjacent face 35 of the synchronizing gear 31. The space between the follower and the gear proper provides a peripheral groove 32 into which extends a yoke fork 33 actuated from a control rod as is usual in similar constructions of transmission casings. From this construction it will be understood that the movement of the yoke fork or arm 33 from left to right as indicated by the arrow will cause the follower plate to bear against the synchronizing gear and in turn to cause the synchronizing gear to bear against the fixed stop provided by the end plate 25. As it is a feature of this disclosure to provide two friction clutching surfaces on opposite sides of the shiftable synchronizing gear it is suggested that one or both of the inter-engaging faces on opposite sides of the synchronizer gear be formed wholly or in part of some friction creating surface material. It is herein suggested that the friction faces be formed as replaceable inserts of corks or bakelite, inset into the gear faces, into the follower plate or into the end plates or all friction faces may be formed entirely or in part of friction forming material. There is illustrated a more simplified showing in which the synchronizing gear is itself made entirely of some friction creating moulded composition, such as bakelite.

In operation and assuming that it is desired to move the gears 19 and 20 from their unmeshed positions shown in Figure 1 into their fully meshed position, as is usual in providing for second speed drives, the control is shifted so as to move the yoke 33 to the right from the position illustrated. The initial movement of the control lever acts to shift the follower into bearing engagement with the synchronizer and in this way provides a clutching engagement between the adjacent side of the synchronizer gear and the follower plate which is keyed to the gear unit. The continued application of pressure against the side of the synchronizing gear would cause the same to move into frictional engagement with the fixed stop plate. In this way the advanced side of the synchronizer gear will be in direct clutching engagement with the gear unit 17.

By this construction it is possible to utilize the available power, manual or mechanical, to effect a clutching operation over two sets of inter-engaging surfaces, thus providing for the necessary clutching engagement with less effort than has been possible heretofore with single sets of inter-engaging clutching faces. It is understood that the clutching of the synchronizer gear to the gear unit provides a frictional driving connection between the shaft 15 and the jack shaft gear 20 so as to cause the shafts 11 and 12 to approach the same speed just prior to the movement of the teeth of the gear 19 into meshing engagement with the teeth of the gear 20, all as has been more fully described in the companion applications.

Referring to the combined indicating and locking feature of the shifter lever, it is noted that the gear casing is provided on its upper side with a bell shaped mounting member 40, in which is mounted a shift lever 42 for universal articulation. A dust cap 44 is fixed to the shifter lever and has a bearing engagement with the member 40. The cap 44 is provided with an H-slot 46 into which extends a pin 47 projecting outwardly from the member 40. It is understood that the lever 42 is designed to make the usual selective engagement with the usual pair of shifter rods controlling the shifter forks 33. The parts are so proportioned and arranged that when the lever is in its neutral position with all of the gear sets unmeshed, the pin will be in the position between the aligned stop arms 49 as shown in Figure 1. When the gear sets are in position to effect the usual first, second, third or reverse speed conditions the pin 47 will correspondingly be positioned in a similarly designated recess portion of the slot 46. This slot and pin engagement will also act to lock the shifter lever against accidental displacement even should there be a failure of the locking means between the gear units and the shaft to hold the parts in their set position.

The shifter fork substantially fills the space between the follower plate and the adjacent unreduced part of the gear unit and acts to secure the elements of the clutch substantially in operative position on the hub. Removing the fork permits the sliding of the follower plate to the left of the showing in Figure 1 thus exposing for inspection both sides of the first clutching part and the similar shifting of the synchronizer gear brings to view both sides of the same. Finally the end plate may be similarly shifted permitting the escape of the locking spring from its associated groove in the hub. With the removal of this spring all the clutch elements may be slipped off the hub.

Having thus described my invention, I claim:

1. In a device of the class described, the combination of a pair of gears adapted to be shifted into a driving relation, one of said gears constituting an element of a double face friction clutch, a two sided coacting clutch element adapted to be moved into meshing relation with the other gear with one of its faces frictionally engaging said first named element, and shiftable means for frictionally engaging the other face of said coacting clutch element.

2. In a device of the class described, the combination of a gear mounted for axial movement to and from a meshing position, said gear provided with a stop constituting one element of a clutch, a coacting clutch element slidable on said gear relative to said stop and adapted to drive the gear on which it is mounted, a follower keyed to the gear and slidable axially into clutching engagement with said coacting clutch element when the same is clutched to the stop and a control for said follower.

3. In a device of the class described, the combination of a gear mounted for axial movement to and from a meshing position, and provided with a stop having a friction surface on one side, a synchronizing device carried by the gear and including a plurality of interengaging clutching surfaces, one of which is designed to engage the friction surface formed on the stop, and a single control member operating in one direction to bear on the synchronizer adjacent its inner periphery to successively bring the different clutching surfaces thereof into operative relation and finally to act through the synchronizer and stop bodily to shift the gear.

4. In a device of the class described, the combination of two members mounted for rotary movement, one comprising a support, a synchronizer for causing the two members to approach the same speed and including a clutch member mounted for rotary movement on the support and free to move axially, a fixed stop on one side of said member and a shiftable follower on the other side of said member and a yoke fork adapted to be shifted into direct bearing engagement with the follower for forcing the follower into clutching engagement with said member and acting therethrough to force said member into clutching engagement with said fixed stop and to shift the synchronizer axially on its support.

5. In a device of the class described, the combination of a single shaft, a gear slidable axially on said shaft, a second gear slidable with the first gear and adapted to rotate relative thereto, means for clutching opposite sides of said second gear to the first gear so as to rotate therewith, and a control member directly connected for actuating said clutching means and for shifting the first gear.

6. In a gear synchronizer, the combination of two members, a synchronizing device for causing the two members to approach the same speed, said device, a double acting clutch including a support having a relatively fixed element carried by one of the members, a shiftable element, free to move in a direction to and from the fixed element and otherwise secured to the support, said device also including a synchronizer gear positioned on said support between said elements and adapted when free of the clutch to rotate on the support, and a yoke fork operatively connected for applying variable pressure directly to the outer side of the shiftable element to cause the same to bear on the gear and to cause the gear to bear on the fixed element thereby to secure the gear in non-rotating relation to the support, through both the fixed and shiftable elements.

7. In a gear synchronizer, the combination of a gear provided with a hub extension constituting a shaft, a clutch element fixed to the shaft, a coacting clutch element keyed to the shaft to turn therewith and free to slide axially of the shaft, a synchronizing gear mounted on the shaft between the elements and adapted to have a freedom of both rotary and manually controlled axial movement thereon, and means acting through the shiftable elements and gear and in a direction axially of the shaft for causing a controlled clutching engagement between opposite sides of the gear and the clutch elements.

8. In a gear synchronizer, the combination of a gear provided with a hub extension constituting a shaft, a stop fixed to the hub extension, a synchronizer gear mounted for rotary and slight axial movement on the shaft, manually controlled means for pressing the gear into frictional clutching engagement with the stop, the gear engaging the stop being formed of a friction material.

9. In a gear synchronizer, the combination with a shaft, a unit keyed to the shaft to turn therewith and adapted to slide thereon, said unit provided with an annular groove, a synchronizer gear mounted for rotary movement in said groove and having a slight freedom of axial movement, control means including a yoke fork in said groove, an annular member positioned between the yoke fork and the synchronizer gear and said yoke fork acting in its movement in one direction to cause said annular member to bear on the synchronizer gear and to act therethrough to shift the synchronizer gear axially and into frictional clutching engagement with a part of the unit which defines one side of the groove.

10. In a gear synchronizer, the combination of a shaft mounted for both rotary and axial movement, means for restraining its axial movement, a synchronizer including a normally inoperative friction clutch for connecting an element of the synchronizer with the shaft. said clutch including a plurality of sets of inter-engaging clutching faces, a control member constituting a source of actuating pressure and operatively connected for apportioning the available pressure to said sets of clutching faces.

11. In a gear synchronizer, the combination of a shaft, a power gear keyed thereto and provided with a reduced extension constituting a hub, a ring fitted to the hub at the end opposite the gear, means for securing the same in place, a synchronizer gear mounted for rotary movement on the hub and adapted to be moved into clutching engagement with the end ring, a follower keyed to the extension to turn therewith and free to move into clutching engagement with the synchronizer gear, and a shiftable fork disposed between the power gear and the follower and adapted to act through the follower and synchronizer gear to move the same into their clutching relations.

12. In a device of the class described, the combination of a gear unit provided with a reduced portion constituting a hub, a fastening means at the free end of the hub, three elements disposed in order from the fastening means and including a stop ring keyed to the hub, a synchronizer gear free to rotate on the hub, a follower plate keyed to the hub and a shifter fork adapted to move the follower plate and the synchronizer gear into clutching relation, said shifter fork substantially filling the space between the follower plate and the unreduced part of the unit and acting to maintain the elements substantially in position.

13. In a device of the class described, the combination of a gear unit, a pair of spaced apart stops with one secured to the unit, a synchronizer mounted on the unit between the stops and an actuating member disposed between one of the stops and the synchronizer and movable in one direction to cause the synchronizer to function, said actuating member in all positions substantially filling the space between the synchronizer and the adjacent stop thereby to constitute a means for locking the synchronizer elements in position, the elements of said synchronizer being slidable on the unit and adapted to be separated from each other and thus disposed in position visible for inspection when the actuating member is removed.

14. In a device of the class described, the combination of a shiftable gear unit provided with a stop constituting a fixed element of a double friction clutch, a follower plate slidable axially on said unit, a synchronizer gear formed of a molded composition providing on opposite sides friction surfaces adapted to coact respectively with the stop and with the follower plate to complete the double friction clutch and a yoke-arm in bearing engagement with the follower plate to move the same into frictional engagement with the composition gear and acting therethrough to force said composition gear into frictional engagement with the stop and adapted to act through the follower plate the gear and the stop to shift the unit.

15. In a device of the class described, the combination of a shiftable gear unit provided with a stop constituting a fixed element of a double friction clutch, a follower plate slidable axially on said unit, a synchronizer gear formed of a molded composition providing on opposite sides friction surfaces adapted to coact respectively with the stop and with the follower plate to complete the double friction clutch, and a yoke arm in bearing engagement with the follower plate to move the same into frictional engagement with the composition gear and acting therethrough to force said composition gear into frictional engagement with the stop.

16. In a gear synchronizer, the combination of a pair of power gears adapted to be synchronized, means for synchronizing said gears, said means including a synchronizer gear with opposite sides constituting a pair of friction surfaces, and manually actuated means for sensitively controlling the intensity of frictional engagement between said synchronizer gear and one of the power gears through both of said friction surfaces.

17. In a device of the class described, the combination of a power gear provided with an annular recess, synchronizing means contained in said recess and including in order a synchronizer gear normally free for rotary movement relative to the power gear, a follower plate keyed to the gear and a manually controlled yoke fork adapted to bear on the follower plate and to act therethrough to shift the synchronizer gear towards one end of the recess and into clutching engagement with the power gear.

18. In a gear synchronizer, the combination of a pair of power gears adapted to be synchronized, means carried by one of the gears for synchronizing the gears, said means including a friction clutch, a synchronizing gear constituting one of the elements of the friction clutch, said synchronizer gear having its opposite faces forming friction creating surfaces and manually actuated pressure means adapted to bear on one of the friction creating surfaces for forcing the other face of the synchronizing gear into frictional engagement with its coacting element of the clutch.

Signed at New York city, in the county of New York and State of New York this 1st day of November, A. D. 1922.

HOWARD J. MURRAY.